United States Patent
Tsukidate

(10) Patent No.: US 6,714,722 B1
(45) Date of Patent: Mar. 30, 2004

(54) MULTIMEDIA RECORDER WITH ENHANCED EPG-RELATED FUNCTIONS

(75) Inventor: Ryota Tsukidate, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/260,063

(22) Filed: Mar. 2, 1999

(30) Foreign Application Priority Data

Mar. 3, 1998 (JP) ............................................. 10-066038

(51) Int. Cl.[7] ................................................. H04N 5/91
(52) U.S. Cl. .............................. 386/83; 386/46; 725/38; 725/39
(58) Field of Search ................................ 386/1, 46, 83; 348/726, 731, 732; 725/38, 39, 44, 87; 360/15, 55, 60

(56) References Cited

U.S. PATENT DOCUMENTS

| | | | |
|---|---|---|---|
| 5,361,173 A | * | 11/1994 | Ishii et al. ...................... 360/55 |
| 5,488,409 A | * | 1/1996 | Yuen et al. ..................... 386/83 |
| 5,543,929 A | | 8/1996 | Mankovitz et al. |
| 5,592,551 A | | 1/1997 | Lett et al. |
| 5,745,640 A | | 4/1998 | Ishii et al. |
| 5,861,906 A | * | 1/1999 | Dunn et al. ..................... 725/87 |
| 6,266,814 B1 | * | 7/2001 | Lemmons et al. ............. 725/44 |
| 6,366,731 B1 | * | 4/2002 | Na et al. ....................... 386/83 |

* cited by examiner

*Primary Examiner*—Thai Tran
*Assistant Examiner*—Christopher Onuaku
(74) *Attorney, Agent, or Firm*—Lowe Hauptman Gilman & Berner, LLP

(57) ABSTRACT

A digital multimedia recorder that makes good use of EPG data to have at least one of the following capabilities of: (a) selecting a program to be played from a displayed program guide for recorded programs; (b) including, in the displayed program guide, program information on programs relating to each of the recorded programs thereby to permit the user to program the recorder to record a selected one of the related program; (c) recording a plurality of programs broadcast at the same time; (d) record a multi-channel program whose channel configuration changes in the middle of the program so as to support the capability (a); and (e) playing a recorded program within a limit prescribed in a contract with a provider. The information includes information on related programs, if any (which are related with each program), and information on recommended programs which a broadcasting party recommends to the subscribers.

4 Claims, 17 Drawing Sheets

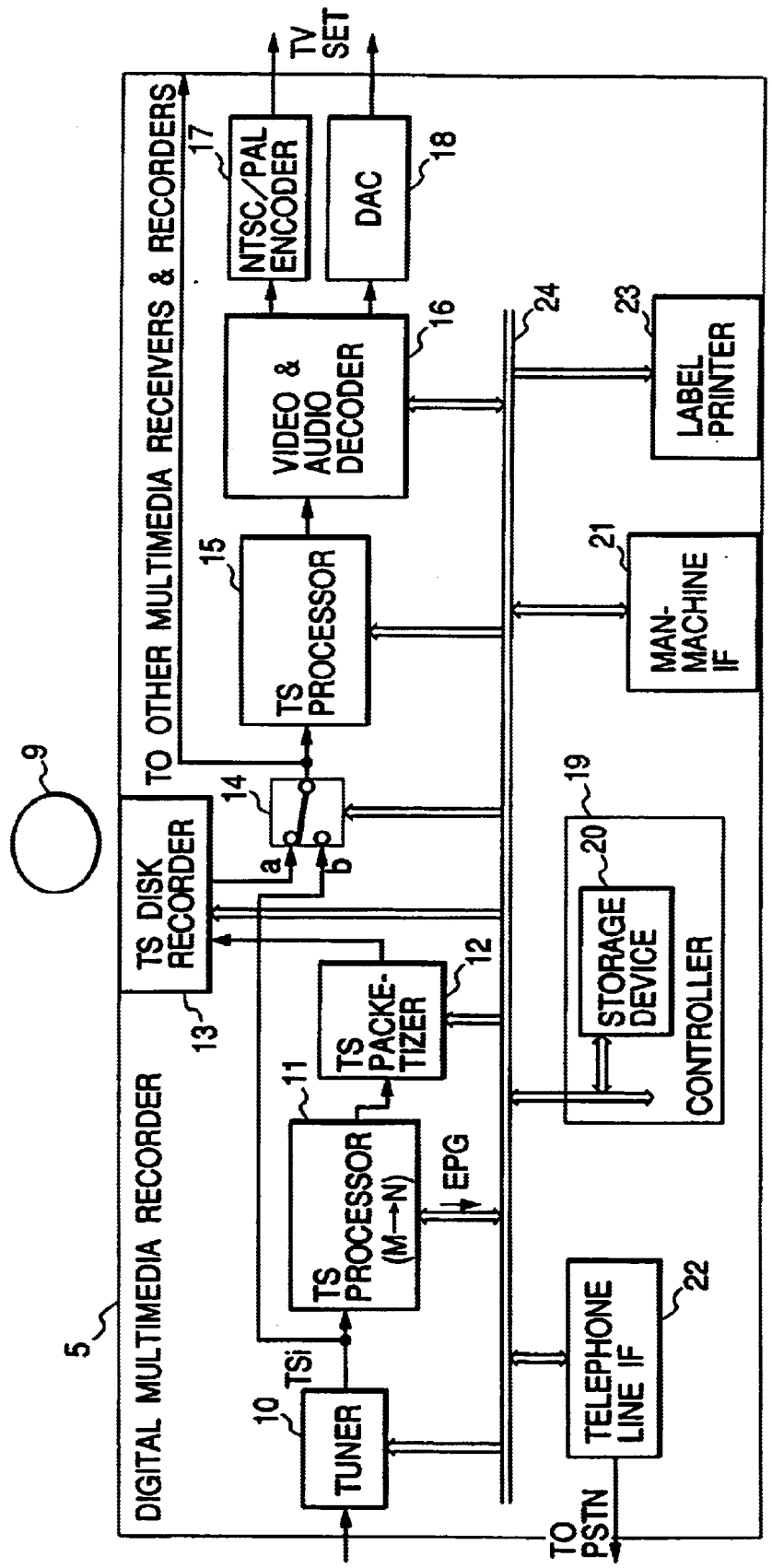

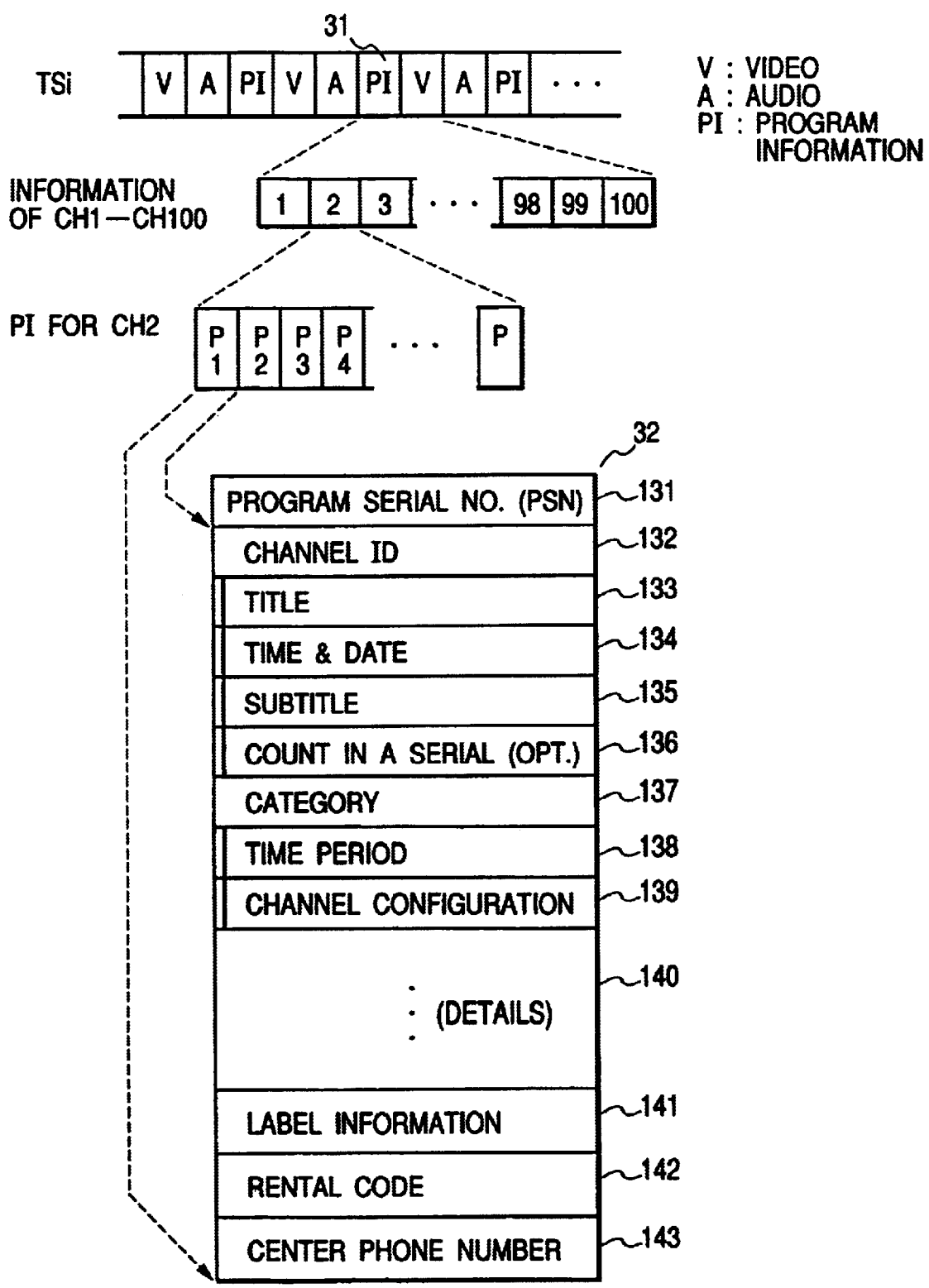

FIG. 4

PROGRAM INFORMATION TABLE STORED IN THE STORAGE DEVICE 20 — 32i

| 131 | 132 | 133 | 134 | 135 | 136 | 137 | 138 | 139 | 140 |
|---|---|---|---|---|---|---|---|---|---|
| ... | ... | ... | ... | ... | ... | ... | ... | ... | ... |
| 100123 | 45 | DORA THE VAGRANT | 1998/2/6 20:00–20:54 | DORA GOES TO DENVER | ... | D7 | 3/15 0–54 | VIDEO1: NTSC<br>AUDIO1: STEREO | ... |
|  |  |  | 1998/2/13 20:00–20:54 | DORA GOES TO BOSTON |  |  | 4/15 |  |  |
|  |  |  | 1998/2/20 20:00–20:54 | DORA GOES TO AUSTIN |  |  | 5/15 |  |  |
|  |  |  | 1998/2/27 20:00–20:54 | DORA GOES TO ALBANY |  |  | 6/15 |  |  |
| ... | ... | ... | ... | ... | ... | ... | ... | ... | ... |
| 100234 | 56 | NFL99: THE SUPER BOWL | 1998/2/6 18:00–20:59 | XX vs. YY | ... | S4 | 0–119 | VIDEO1: NTSC [ORDINARY RELAY]<br>VIDEO2: NTSC [XX SIDE]<br>VIDEO3: NTSC [YY SIDE]<br>AUDIO1: STERIO [ORDINARY RELAY]<br>AUDIO2: MONO [ON THE XX SIDE]<br>AUDIO3: MONO [ON THE YY SIDE] | ... |
|  |  |  |  |  |  |  | 120–179 | VIDEO1: NTSC [ORDINARY RELAY]<br>VIDEO2: NTSC [XX SIDE]<br>VIDEO3: NTSC [YY SIDE]<br>AUDIO1: STERIO [ORDINARY RELAY]<br>AUDIO2: MONO [ON THE XX SIDE]<br>AUDIO3: MONO [ON THE YY SIDE]<br>AUDIO4: MONO [COMMENTARY] |  |
| ... | ... | ... | ... | ... | ... | ... | ... | ... | ... |

32r (braces group columns 136–139)

FIG. 5

RECOMMENDED PROGRAM LIST TRANSMITTED IN THE EVENT LIST TABLE
40

| LIST TITLE | THE NAGANO WINTER OLYMPICS RELAY | 41 |
|---|---|---|
| VALID PERIOD | 1998/2/7 — 1998/2/18 | 42 |
| CHANNEL NUMBER | BROADCAST TIME & DATE | |
| 15 | 1998/2/7 10:00 — 11:59 | |
| 7 | 1998/2/9 13:00 — 14:59 | |
| 8 | 1998/2/13 13:00 — 14:59 | |
| ⋮ | ⋮ | |

RECORDING QUEUE

| CHANNEL NUMBER | BROADCAST TIME & DATE |
|---|---|
| 17 | 1998/2/10 17:00 — 17:59 |
| 78 | 1998/2/11 13:00 — 14:59 |
| 6 | 1998/2/11 21:00 — 22:56 |

RECORDED PROGRAM INFORMATION TABLE 47

| Field | |
|---|---|
| RECORDED PROGRAM SERIAL NUMBER | 145 |
| MEDIUM (OR VOLUME) ID | 146 |
| RECORDING LOCATION | 147 |
| CHANNEL ID | 132 |
| TITLE | 133 |
| BROADCAST TIME & DATE | 134 |
| SUBTITLE | 135 |
| COUNT IN A SERIAL | 136 |
| CATEGORY CODE | 137 |
| TIME PERIOD | 138 |
| CHANNEL CONFIGURATION | 139 |
| ⋮ (DETAILS) | 140 |
| LABEL INFORMATION | 141 |
| RENTAL CODE | 142 |
| CENTER PHONE NUMBER | 143 |
| PERMITTED PLAY COUNT | 148 |
| EXPIRATION DATE | 149 |
| ⋮ (OTHERS) | 150 |

FIG. 9

RECORDED PROGRAM INFORMATION (RPI) RECORDED ON THE RECORDING MEDIUM

| Field | |
|---|---|
| RECODER 5 ID | 151 |
| RPI RECORDS | 47 |
| RECOMMENDED PROGRAM LISTS (IF ANY) | 40 |

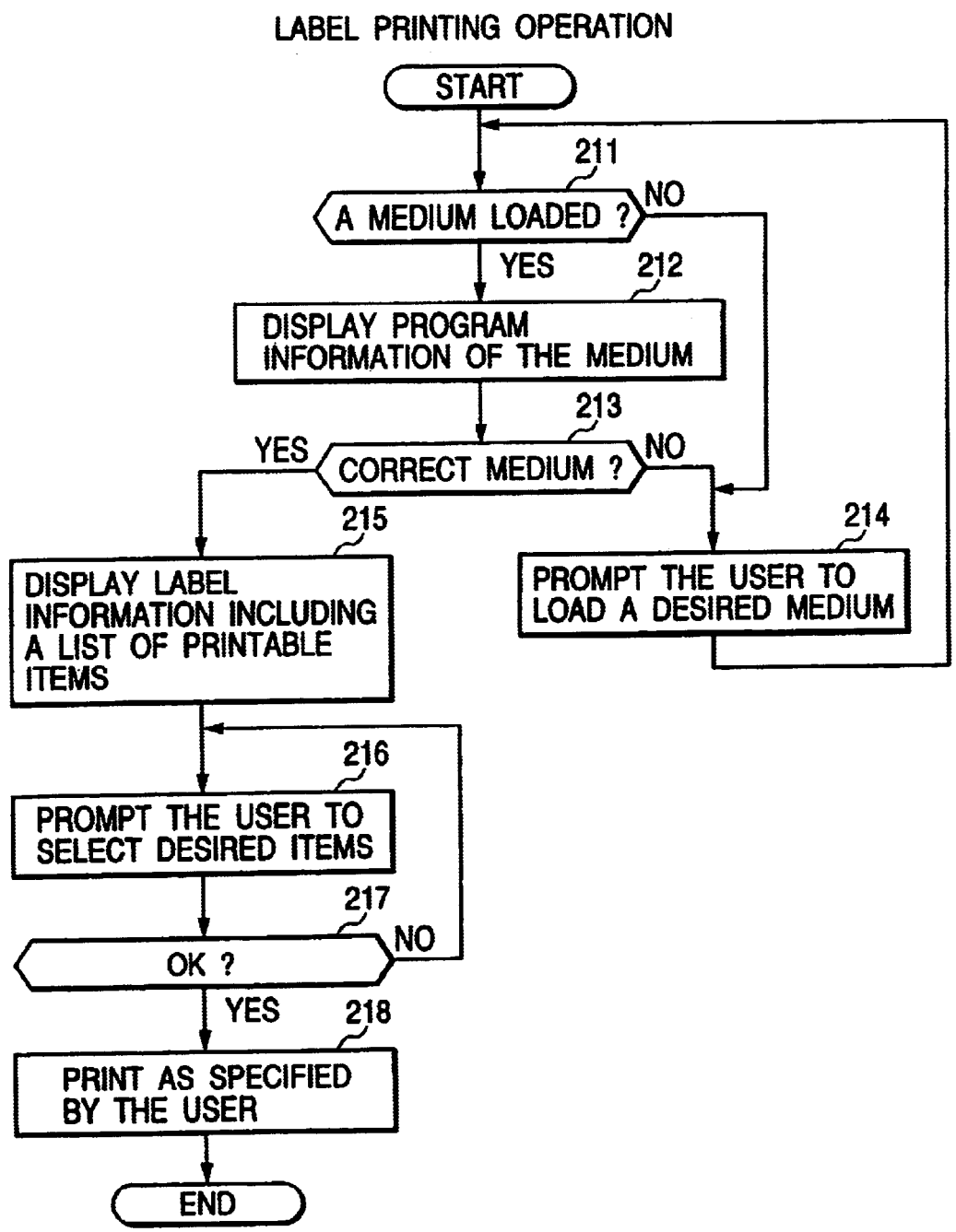

MULTIMEDIA RECORDER WITH ENHANCED EPG-RELATED FUNCTIONS

BACKGROUND OF THE INVENTION

1. Field of the Invention

The invention generally relates to a broadcasting system and more particularly to a multimedia recorder with recorded program management functions based on EPG data, a TV receiver provided with such a recorder, and a system for supporting such functions in a broadcasting equipment.

2. Description of the Prior Art

Generally, in digital broadcasting systems, at least one broadcasting station broadcasts a transport stream (TS) defined in MPEG-2 (Moving Picture Experts Group II) standard. The transport stream (or a physical channel) includes a plurality of (logical) channels in a time-division-multiplexed form. Each logical channel includes many programs. Each program comprises at least one video subchannel, at least one audio subchannel and/or at least one data subchannel. Program specific information (PSI) and service information (SI) on each program are frequently inserted in the TS.

Such digital broadcasting systems usually provide far many channels as compared with analog broadcasting systems and accordingly an enormous number of programs. This makes channel or program selection difficult. In order to facilitate program selection, information on programs is transmitted as EPG (Electronic Program Guide) enabling the subscribers to select a program to watch and to program a VCR (video cassette recorder) to record a desired program by displaying a program schedule and selecting the desired program through a remote controller.

If one of the recorded programs is to be played in conventional video recorder such as a VCR, then the user often takes a lot of time to find a desired one of recorded programs recorded on recording medium. The user may even forget the programs he or she recorded in a recording medium. In this case, the user has to search the recording media to see what programs are recorded on the recording media if he or she has not made notes at the recording times.

SUMMARY OF THE INVENTION

The invention is directed to solving this and other problems and disadvantages of the prior art. It is an object of the invention to provide a digital multimedia recorder that makes good use of EPG data to have at least one of the following capabilities of:

(a) selecting a program to be played from a displayed program guide for recorded programs;

(b) including, in the displayed program guide, program information on programs relating to each of the recorded programs thereby to permit the user to program the recorder to record a selected one of the related program;

(c) recording a plurality of programs broadcast at the same time;

(d) record a multi-channel program whose channel configuration changes in the middle of the program so as to support the capability (a); and (e) playing a recorded program within a limit prescribed in a contract with a provider.

Generally, information on programs such as EPG is referred to as "program information." Hereinafter, it is assumed that the program information includes information necessary for extracting a desired program from the received TS's, information on each program, information on related programs, if any (which are related with each program), and information on recommended programs which a broadcasting party recommends to the subscribers.

According to one aspect of the invention, a method of managing recorded programs recorded in a recording medium in a broadcasting system is provided. The broadcasting system comprises at least one transmitter and a plurality of terminals. Each transmitter broadcasts a data stream. A plurality of channels is multiplexed into each data stream. Each channel comprises a plurality of programs. Each transmitter includes, in the data stream, program information on the programs available in the broadcasting system. Each terminal permits a user to select a desired one of the programs; adds the selected program to a recording queue which keeps program-identifying data sets in order of broadcast start time; records on the recording medium a program identified by one of the program-identifying data sets in a first position of the recording queue; records a program information record of the recorded program in a predetermined area on the recording medium; in response to a reception of a playing request from the user; displays a program guide for the recorded programs recorded on the recording medium; prompts the user to select one of said recorded programs for play; in response to the user selecting one of the recorded programs, plays the selected recorded program to provide video and/or audio output(s).

According to another aspect of the invention, a multimedia reproducer for reproducing recorded programs recorded on a recording medium is provided. Program information comprising program information (PI) records associated with said recorded programs is also recorded on the recording medium. The multimedia reproducer comprises: means, responsive to a reception of a reproducing request from the user, for displaying a program guide for the recorded programs and prompting the user to select one of the recorded programs for play; and means, response to the user selecting one of the recorded programs, for reproducing the selected recorded program.

BRIEF DESCRIPTION OF THE DRAWING

The features and advantages of the present invention will be apparent from the following description of an exemplary embodiment of the invention and the accompanying drawing, in which:

FIG. 2 is a schematic block diagram showing an arrangement of an illustrative embodiment of a digital multimedia disc recorder which is according to the invention and which is used as the recorder 5 of FIG. 1;

FIG. 3 is a diagram showing an exemplary manner of creating a program information table 32 stored in the storage device 20;

FIG. 4 is a diagram showing two exemplary records 32r of the PI table 32t.

FIG. 5 is a diagram showing an exemplary structure of a recommended program list according to the principles of the invention;

FIG. 7 is a diagram showing the contents of the recording queue 45;

FIG. 8 is a diagram showing an exemplary structure of a recorded program information record 47 of a recorded program which record is recorded in a predetermined location of the recording medium 9 and which is stored in the recorded program information table 47 stored in the storage device 20;

FIG. 9 is a diagram showing an exemplary RPI (recorded program information) recorded on the recording medium 9 according to the invention;

FIG. 10 is a flowchart showing a exemplary label printing operation executed in response to a printing request from the user;

Throughout the drawing, the same elements when shown in more than one figure are designated by the same reference numerals.

DETAILED DESCRIPTION OF THE PREFERRED EMBODIMENTS

Figure 1:
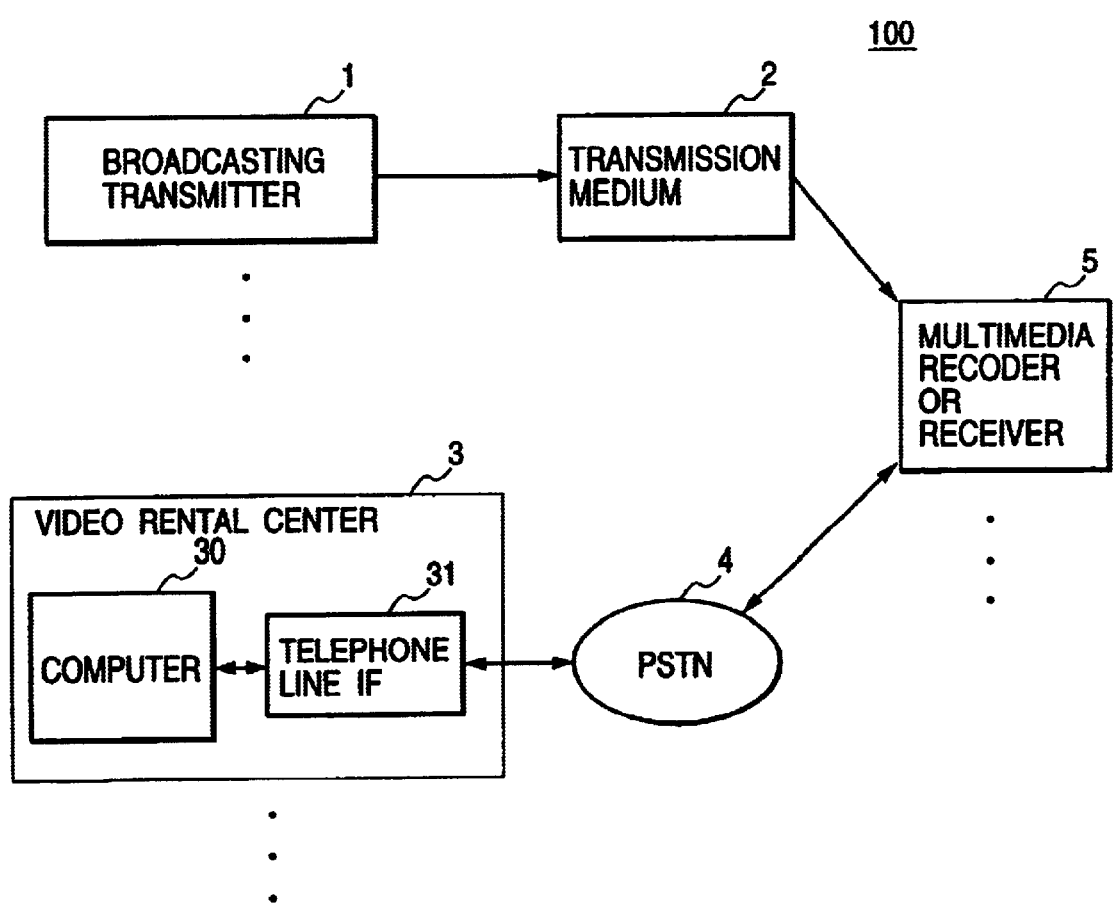
FIG. 1 is a diagram showing an exemplary arrangement of a digital multimedia broadcasting system 100 according to the principles of the invention.

FIG. 1 is a diagram showing an exemplary arrangement of a digital multimedia broadcasting system 100 according to the principles of the invention. In FIG. 1, the digital multimedia broadcasting system 100 comprises at least one broadcasting transmitter 1, a transmission medium 2 and a multiplicity of receiver terminals 5 such as a digital multimedia recorder, a digital TV with a recording capability, and any other terminal with digital broadcast receiving and recording capabilities. The broadcasting station 1 preferably transmits, through the transmission medium 2, a modulated signal of a transport stream (TS) defined in the MPEG-2 standard. The transmission medium may be any of a satellite, the terrestrial air and cables. The digital multimedia broadcasting system 100 may optionally include one or more video rental center 3, which comprises a computer 30 and a telephone line interface (IF) 31 for permitting the computer 30 to communicate with the terminal 5 through a public switched telephone network 4. The center 3 computer 30 creates and stores a record of a rented video title, information on a customer, and the term of validity or the number of permitted plays for the title in response to a rental request from a terminal 5, and informs the terminal 5 of the term of validity or the remaining number of permitted plays in response to a request for playing a rented video title.

FIG. 2 is a schematic block diagram showing an arrangement of an illustrative embodiment of a digital multimedia disc recorder which is according to the invention and which is used as the recorder 5 of FIG. 1. In FIG. 2 the disc recorder 5 comprises a tuner 10 for receiving a plurality of broadcast signals from the broadcasting stations 1; a TS processor (M→N) 11 having its input connected with a tuner 10 output; a TS packetizer 12 having its input connected with a TS processor 11 output; a TS disc recorder 13 having its recording input connected with a TS packetizer 12 output; a one-of two selector 14 having it two inputs connected with a TS disc recorder 13 output and a node between the TS processor 11 output and the TS packetizer 12 input; a TS processor 15 having its input connected with a selector 14 output; a video and audio decoder 16 having its input connected with a TS processor 15 output; an NTSC/PAL encoder 17 having its input connected with a decoder 16 video output; and a digital-to-analog converter (DAC) 18 having its input connected with a decoder 16 audio output.

The digital multimedia disc recorder 5 further comprises a controller 19 that includes a storage device 20; a man-machine interface 21 for enabling the user to control the recorder 5; a telephone interface 22 connected with the PSTN 4; a label printer 23; and a bus 24 for enabling communications among the elements 10 through 16 and 18 through 23. The man-machine interface 21 includes a remote controller.

The TS recorder 13 of the disc recorder 5 is adapted for a removable disc storage medium 9, e.g., an optical disc, a magnetic disc cartridge, etc. As for information of each of broadcast programs recorded in a recording medium 9, the disc recorder 5 preferably not only keeps it in the storage device 20 as long as the program is being stored in the recording medium 9 but also records it at a predetermined location of the recording medium 9. This permits the recording medium 9 to be played in other disc recorder 5 of the same kind. For this purpose, the TS recorder 13 records TS's on a recording medium 9 such that the recording medium 9 has a program information area of a predetermined size at a predetermined location.

As seen from just above paragraph, the storage device 9 is preferably a nonvolatile memory or a battery backed-up RAM (random assess memory).

FIG. 3 is a diagram showing an exemplary manner of creating a program information table 32 stored in the storage device 20. Referring to FIGS. 2 and 3, the operation of the multimedia disc recorder 5 will be described in the following. The broadcast signals (physical channels) from the broadcasting stations 1 are received by the tuner 10. The tuner 10 selectively demodulates one of the received broadcast signals (which include respective transport streams TS1, TS2, . . . ) into a transport stream TSi (i: a TS number) according to a TS selection instruction from the controller 19. It is assumed that a transport stream TSi includes M logical channels in a well-known time-division-multiplexed manner. The TS processor 11 supplies, to the TS packetizer 12, packets for N logical channels selected according to a channel selection instruction from the controller 19, where M is the number of logical lie channels 1 in the selected transport stream TSi, and N is the number of selected logical channels. So, N≦M.

(In this document, the terms "physical channel" and "logical channel" mean a TS and a channel included in a TS, respectively. If the term "channel" is simply used, it means "logical channel.")

The TS processor 11 outputs program information (PI) 31 on the bus 24 in response to a PI request from the controller 19. The program information 31 obtained from the schedule EIT (Event Information Table defined in the DVB (Digital Video Broadcasting)) of TSi includes basic PI for all the programs provided through all the available channels CH1, CH2, . . . , CH100 (it is assumed that 100 (logical) channels are available in this specific broadcasting system 100) and detailed PI for the programs provided through the M logical channels in TSi.

The controller 19 updates the program information table 32 by using the program information from the TS processor 11. Each record of the program information table has a structure 32 as shown in FIG. 3. Specifically, each record comprises a program serial number 131 the recorder 5 assigns uniquely to each program when program information for the program is received for the first time, a channel ID 132 unique to the channel, a title 133 of the program, broadcast time and date 134, a subtitle 135, a broadcast count in a serial 136 which is optionally used for programs in serial form, a category code 137 that contains a category code indicative of the category of the program, time period 138 during which a channel configuration of the program is valid, a channel configuration 139 which indicates channels constituting the program during the corresponding time period 138, further details 140 on the program, and label information 141 (detailed later). Each record of the program information table 32 further includes a rental code 142 indicative of rental conditions of the program and a center phone number 143 (in case of a program for rental) in order to enable rental video business through the digital broadcasting system 100 in a manner as detailed later. It is noted that the storage device 20 stores a category table (not shown) that associates category codes with corresponding category name.

The program serial number 131 is expressed in such a limited number of digits as can be used for sufficiently larger number. When the number 131 reaches a possible maximum number, the number 131 is set to, e.g., one at the time of registration of the next program.

The fields with the left side drawn in a double line in FIG. 3 can have multiple values as shown in FIG. 4. FIG. 4 is a diagram showing two exemplary records 32r of the PI table 32t.

In FIG. 4, the record "100123" for a program which is titled "Dora the vagrant" and which is to be broadcast from 20:00 to 20:54 on Jun. 2, 1999, has three additional values for each of the fields 134 through 136. Doing this enable a program information for one program to inform the subscribers of the subsequent three broadcasts (i.e., the fourth, fifth and sixth broadcasts of 15 serialized programs in this example) of the serial "Dora the vagrant." The title fields 133 for the additional program information has no values because the additional information is for serialized programs. However, program information for any related programs of different types may be included in each record by containing a title in the title field 133.

On the other hand, the record 100234 for a program which is titled "NFL 99: The Super bowl" and which is to be broadcast from 18:00 to 20:59 on Jun. 2, 1999, has one additional value for each of the fields 138 and 139. This means that the channel configuration of the program No. 100234 changes once in the middle of the period from 18:00 to 20:59. Specifically, the program 100234 is broadcast through three video channels and three audio channels for the first 120 minutes from the beginning (i.e., for a period from 18:00 to 19:59) and then through three video channels and four audio channels for the subsequent 60 minutes (i.e., for a period from 18:00 to 18:59). This enables the subscribers to select a desired combination of video and audio channels for a multi-channel program (which means a program which is broadcast through more than one optional channels for video, audio or each of video and audio in this document).

In this example, a period for which a certain channel configuration is defined is expressed in terms of relative start and end times from the beginning of the program. However, the period may be identified by a start value and an end values expressed in terms of relative positions from the beginning of the program on the recording medium.

Though in just described example a multi-channel program is comprised of a video channel and an audio channel, a program may include a data channel. It should be noted that a program may be comprised of only one or more data channel.

A broadcasting party is also permitted to include a recommended program list associated with a logical channel or a program in a table, which we have defined and we call "Event Collection Table" or "ECT". FIG. 5 is a diagram showing an exemplary structure of a recommended program list 40. The recommended program list 40 comprises a list title 41, a valid period 42 of the list 41 and at least one record comprising the channel ID 132 and the broadcast time and date 134. Since the combination of the channel ID 132 and the broadcast time and date 134 is used for identifying a program record associated with the channel ID 132 and the broadcast time and date 134, information contained in any fields of the record of the program identified by the channel ID 132 and the broadcast time and date 134 can be displayed.

It is noted that the broadcasting party is permitted to set a valid period to the list 40. When the recommended program list 40 is displayed at 9:00 on Feb. 9, 1998, only the programs that begins after 9:00 on Feb. 9, 1998, are displayed, i.e., only the second and subsequent programs of the list whose valid period includes the time 9:00 and the date Feb. 9, 1998, are displayed.

Figure 6:
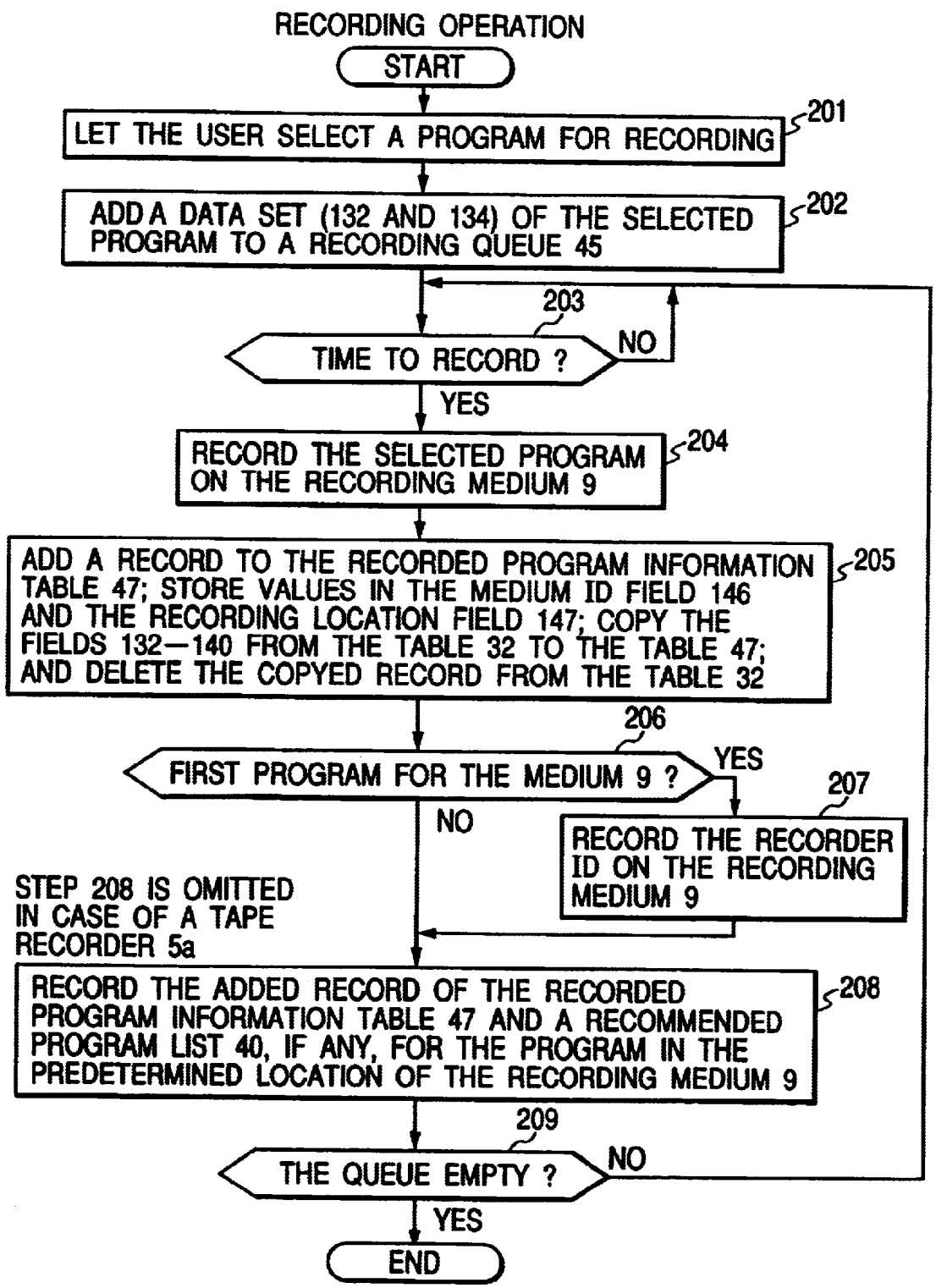
FIG. 6 is a flowchart showing an recording operation executed by the controller 19 in response to the user pressing a request button for programmed recording.

When the broadcasting of a program has been completed, the controller 19 deletes not only the record for the just broadcast program from the program information table 32 but also recommended program lists 40, if any, that contain the channel and program IDs for the just broadcast program as the program to be last broadcast in the list. Recording Operation FIG. 6 is a flowchart showing an recording operation executed by the controller 19 in response to the user pressing a request button for programmed recording. In step 201, the controller 19 first displays a program guide table based on the program information table 32 and lets the user select one of the displayed programs. It should be noted that the user is permitted to select a desired number of channels for any identical time period as long as the channels are of an identical TS, e.g., even all the logical channels in a physical channel.

In step 202, the controller 19 adds a data set (i.e., the values of the channel ID field 132 and the broadcast time & date field 134) of the selected program to a recording queue 45 of FIG. 7. The data sets are preferably arranged in order of broadcast start time in the recording queue.

In step 203, a test is made to see if it is time to record. This step is repeated until it becomes a recording time of an earliest program in the queue 45. If the time is reached in step 203, the controller 19 records the earliest program in the queue 45 by informing the tuner 10 and the TS processor 11 of the transport stream and the channel IDs to receive and sending suitable instructions to the TS packetizer 12 and the TS recorder 13 in step 204. Alternatively, if the user operates the controller or the man-machine interface 21 in a predetermined manner to record the receiving program, the controller 19 also records the receiving program by simply sending the suitable instructions to the TS packetizer 12 and the TS recorder 13 in step 204. In either case, the TS packetizer 12 packetizes the received packet stream (PES (Packetized Elementary stream) packets in the MPEG-2 standard) into a TS packet stream, which is then recorded by the TS recorder 13 in the recording medium 9.

On completing the recording of the program, in step 205, the controller 19 adds a record to the recorded program information table 47 as shown in FIG. 8; stores values in the medium ID field 146 and the recording location field 147; copies the fields 132–143 from the table 32 to the table 47; and deletes the copied record from the table 32. A recorded program serial number is assigned by the controller 19 to each of the recorded programs in the recorded order. The controller 19 also assigns a medium (or volume) ID to each of the recording media 9 on which the recorder 5 has recorded any program even once.

In step 206, the controller 19 makes a test to see if the recorded program is the first one for the recording medium 9. If so, a digital multimedia recorder 5 ID stored in, e.g., a not-shown ROM (read only memory) within the controller 19 is recorded in a predetermined location on the recording medium 9 in step 207. Otherwise, the controlled is passed to step 208.

In step 208, the controller 109 records the added recorded in the recorded program information table 47 and a recommended program list 40, if any, for the program in the predetermined location of the recording medium 9. In step 209, the controller 10 makes a test to see if the queue is empty. If so, the controller 19 ends the operation. Otherwise, the controller 19 returns to step 203.

In this way, a specified program and recorded program information (RPI) for the program are recorded on the recording medium 9 as shown in FIG. 9. This enables a recording medium 9 recorded by one recorder 5 to be played in other recorder 5 of the same kind.

If the RPI for all of the programs recorded by the recorder 5 is stored in the storage device 20, then using any suitable database management system and including key words in each RPI record of the table 47 facilitates the management of the recorded programs such as the retrieval of recorded program.

Turning now to FIG. 2, in recording operation, the switch 14 is kept to b-side. It is noted that the user is permitted to select one of the M logical channels of the received TSi for watching as well as above-mentioned N channels for recording. In this case, the controller 19 controls the TS processor 15 to supply the selected channel for watching to the video & audio decoder 16.

Printing a Label

According to the principles of the invention, the broadcasting transmitter 1 preferably includes label information 141 in the program information for programs for rental. The label information 141 of a program includes texts on the program and one or more icons. The label information may be printed on a label or seal, which is stuck on the recording medium on which the program has been recorded. Alternatively, The label information may be printed directly on the recording medium. FIG. 10 is a flowchart showing a exemplary label printing operation executed in response to a printing request from the user. In step 211, a test is made to see if a medium 9 is loaded in the TS recorder 13. If so, the controller 19 displays program information of the program recorded on the medium 9 in step 212 and asks the user in step 213 if the medium is a correct one. If not, or if the test result is NO in step 211, the controller 19 prompt the user to load the TS recorder 13 with a desired medium 9 in step 214 and returns to step 211.

If the test result is YES in step 213, the controller 19 displays label information 141 including a list of printable items in step 215, prompts the user to select desired items in step 216, and asks the user if it is OK. If not, the control is returned to step 216. If it is OK in step 217, the controller 19 pass the data the user selected to the label printer 218 to print as specified by the user in step 218, and ends the operation.

RPI Table Maintenance Operation

Figure 11:
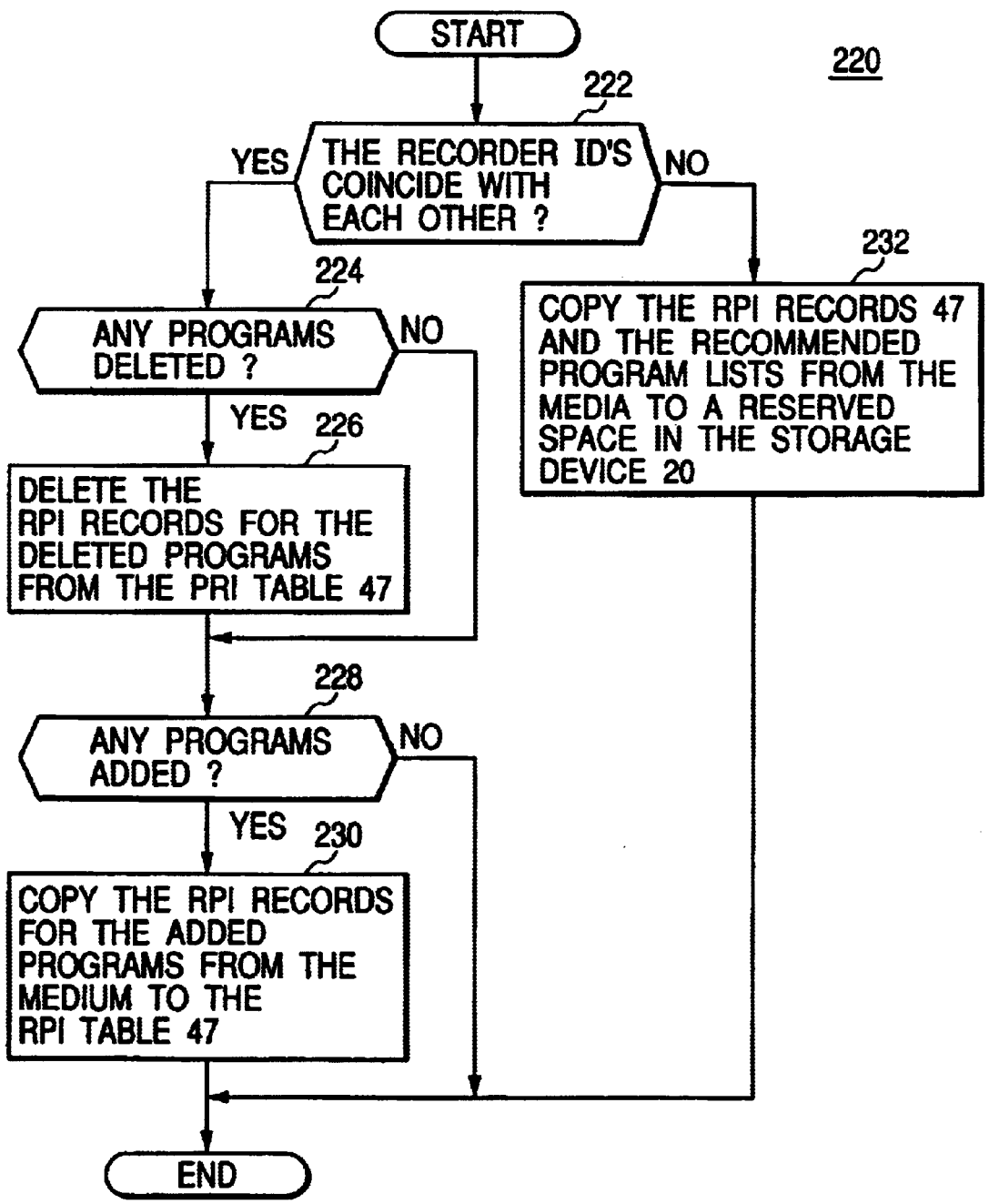
FIG. 11 is a flowchart showing an RPI table maintenance operation executed in response to a loading the TS recorder 13 with a recording medium 9.

FIG. 11 is a flowchart showing an RPI table maintenance operation executed in response to a loading the TS recorder 13 with a recording medium 9. If the user inserts a recording medium 9 into the TS recorder 13, the controller 19 starts the operation of FIG. 11. In step 222, the controller 19 makes a test to see if the recorder ID stored in the medium 9 coincides with that of stored in the above-mentioned ROM (not shown) within the controller 19. If not, then the controller 19 simply copies the RPI records 47 and the recommended program lists from the media 9 to a reserved space in the storage device 20 in step 232, and ends the operation. Thereafter, the copied data is used in subsequent operation.

If the test result is YES in step 222, then the controller 19 makes another test in step 224 to see if there are any programs that have been deleted (by other recorder 5). If any, the controller 19 deletes the RPI records for the deleted programs from the RPI table 47 in step 226, and makes further test in step 228 to see if there are any programs that have been added (by other recorder 5). If so, the controller 19 copies the RPI records for the added programs from the medium 9 to the RPI table 47 in step 230, and ends the operation. If the test result is NO in step 228, the controller 19 simply ends the operation.

This operation causes the RPI table 47 to reflect the contents of the recording media 9 that have been used in the digital multimedia recorder 5.

Application for a Video Rental

According to the principles of the invention, some of the programs are for rental. Information on whether a program is for rental or not is displayed when the program guide for the program is displayed according to the rental code 142 of the RPI record for the program. The rental code 142 indicates the state of the program with respect to video rental as shown in the table below.

TABLE

| rental code | 0 | 1 | 2 |
|---|---|---|---|
| state | not for rental | for rental yet applied | applied for rental |

Figure 12:
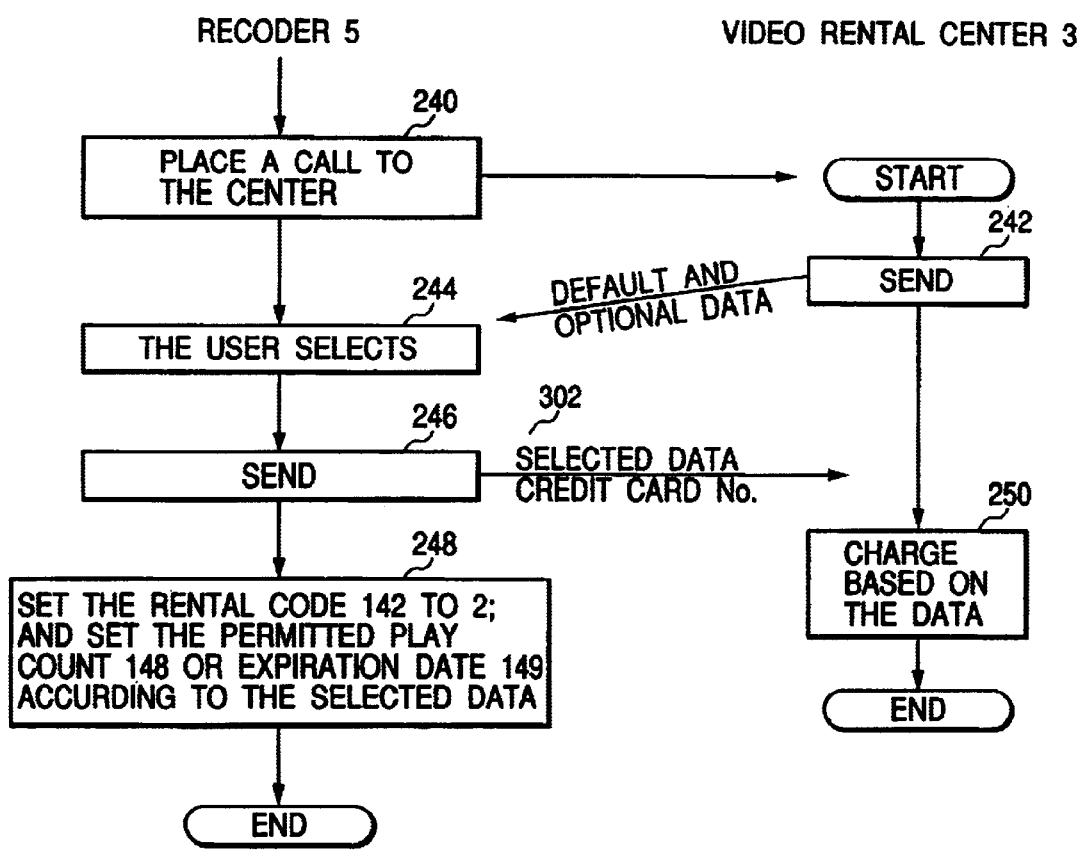
FIG. 12 is a diagram for describing an exemplary video rental data registration operation according to the invention.

If the user finds from the program guide that a program is for rental, he or she may desires to rent the program. In order to apply for a rental of the program, the user presses a predetermined rental button of the man-machine IF 21 while selecting a desired program. Responsively, a video rental data registration operation of FIG. 12 is started. In FIG. 12, the controller 19 places a call to a video rental center 3 using the center phone number 143 contained in the RPI record for the program in step 240. In response to a reception of the call, the computer 30 of the video rental center 3 sends default and optional data to the recorder 5 in step 242. Responsively, the controller 19 displays the received data and prompts the user to select a desired limit value in step 244. In step 246, the controller 19 sends the selected value and a credit card number of the user to the center 3. In step 248, the controller 19 sets the rental code 142 to 2, and sets the permitted play count 148 or the expiration date 149 based on the selected limit value, and then ends the operation. Also, the center 3 computer 30 charges to the user's account in step 250 and ends the operation.

Operation of Playing or Reproducing a Recorded Program

Figure 13:
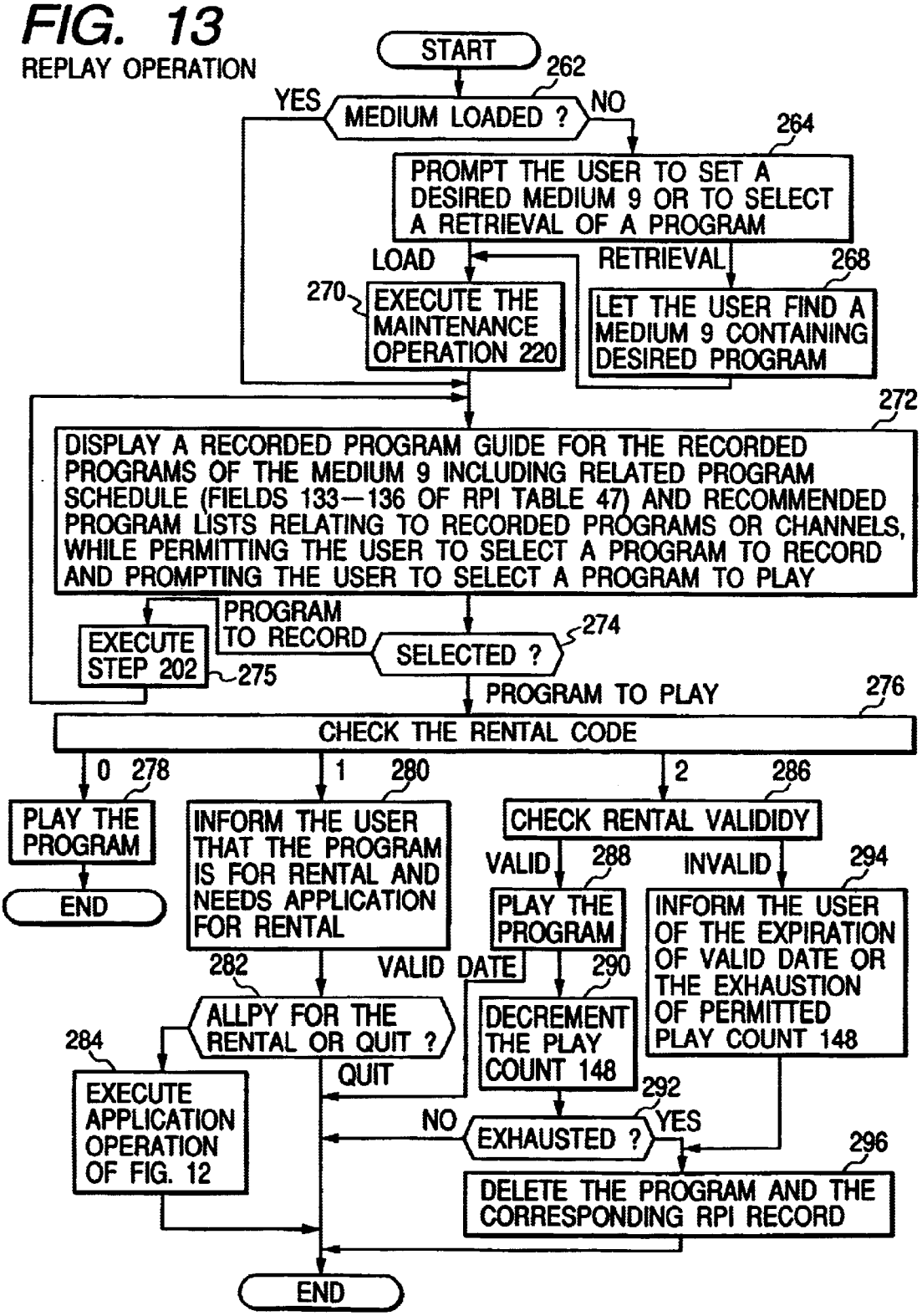
FIG. 13 is a flowchart showing a exemplary playing operation executed by the controller in response to a pressing of a play button of the man-machine interface 21 in accordance with the principles of the invention.

FIG. 13 is a flowchart showing a exemplary playing (or reproducing) operation executed by the controller in response to a pressing of a play button of the man-machine interface 21 in accordance with the principles of the invention. In FIG. 12, the controller 19 makes a test in step 262 to see if the TS recorder 13 is loaded with a recording medium 9. If not, the controller prompts the user to set a desired medium 9 or to select a retrieval of a program in step 264. If the user has selected the retrieval, the controller 19 let he or she find a recording medium 9 containing his or her desired program in step 268. If a seeking recording medium 9 is found, it will be loaded into the TS recorder 13.

If the user loads the TS recorder 13 after step 264 or 268, the controller 19 executes the RPI table 47 maintenance operation 220 in step 270. In step 272, the controller displays a recorded program guide for the recorded programs of the medium 9 including related program schedule (from fields 133–136 of RPI table 47) and recommended program lists relating to recorded programs or channels, while permitting the user to select a program to record and prompting the user to select a program to play or reproduce. In this case, each recommended program list may include various information that can be obtained from the program information table 32 by using the channel ID 132 and the broadcast time & date 134. In step 274, the user can select either a program to record or a program to play.

If the user selects a program to play in step 274, the controller 19 executes step 202 of FIG. 6 and returns to step 272.

If the user selects a program to play in step 274, the controller 19 checks the rental code 142 in step 276. It should be noted that selecting a program includes selecting channels from the available subchannels for the program. The available subchannels are obtained from the fields 139 of the program information table 32 or the RPI table 47.

If the rental code is zero, meaning that the program is not for rental, i.e., an ordinary broadcast program, then the controller 19 simply play the program in step 278. Specifically, the controller 19 set the switch 14 to the a side so as to connect the TS recorder 13 output with the TS processor 15 input, and controls the TS processor 15 to supply packets for the channel selected in step 274 to the video and audio decoder 16, the outputs from which are converted into such signals as are adapted to a television (TV). The programs reproduced from the recording media 9 can be supplied to external TV's and video recorders.

If the rental code is one, meaning that the program is for rent and has to be registered for rent, then the controller 19 informs the user to the effect in step 280, and asks the user in step 282 if the user desires either to apply for the rental of the program or to quit simply. In the latter case, the controller 19 ends the operation. In the former case, the controller 19 executes the application operation of FIG. 12, and ends the operation.

If the rental code is two, meaning that the program is for rent and has been registered for rent, then the controller 19 makes a test to see if the registered condition is still valid referring to the permitted play count 148 and the expiration date 149 in step 286. If so, the controller 19 plays the selected program in step 288. If the expiration date 149 field had a valid value in step 286, the controller 19 ends the operation. If the permitted play count field 148 had a nonzero value in step 286, then the controller 19 decrements the value of the filed 148 in step 290. If the count 148 has become zero in step 292, the controller 19 deletes the played program (from the medium 9) and the corresponding RPI record both from the medium 9 and the RPI table 47 in step 296. If the permitted play count 148 is still valid in step 292, the controller 19 ends the operation.

If the registered condition is invalid in step 286, the controller 19 informs the user of the expiration of valid date 149 or the exhaustion of permitted play count 148 in step 294, and deletes the played program (from the medium 9) and the corresponding RPI record both from the medium 9 and the RPI table 47 in step 296.

It is noted that at the end of this operation, the controller 19 may execute a step like step 272. In this case, the controller 19 displays a program guide based on the program information table 32 instead of the RPI table 47 prompting the user to select a program to record without prompting the user to select a program to play.

According to the present invention, if the user desires to play a recording medium 9, he or she can select a program from the program guide displayed for the recorded programs of the recording medium 9.

In step 286, the validity has been checked by using the fields 148 and 149. Instead of doing this, the validity may be checked by referring to the center 3 for the validity of the program.

Also, a rental video business can be carried out through a broadcasting system according to the invention. Alternatively, a video software vending business may be carried out through the broadcasting system according to the invention as described later.

It is noted that the recorder 5 may be configured such that if the user performs a predetermined operation during the above-described step 278 or 288, the controller 19 displays a recorded program guide for the program being reproduced including related program schedules and recommended program lists relating to the program or the channel being reproduced, while permitting the user to select one of the programs included in the displayed program schedules and the recommended program lists for recording. In response to the program selection by the user, the controller 19 adds the selected program to the above-mentioned queue.

Digital Multimedia Tape Recorder

Figure 14:
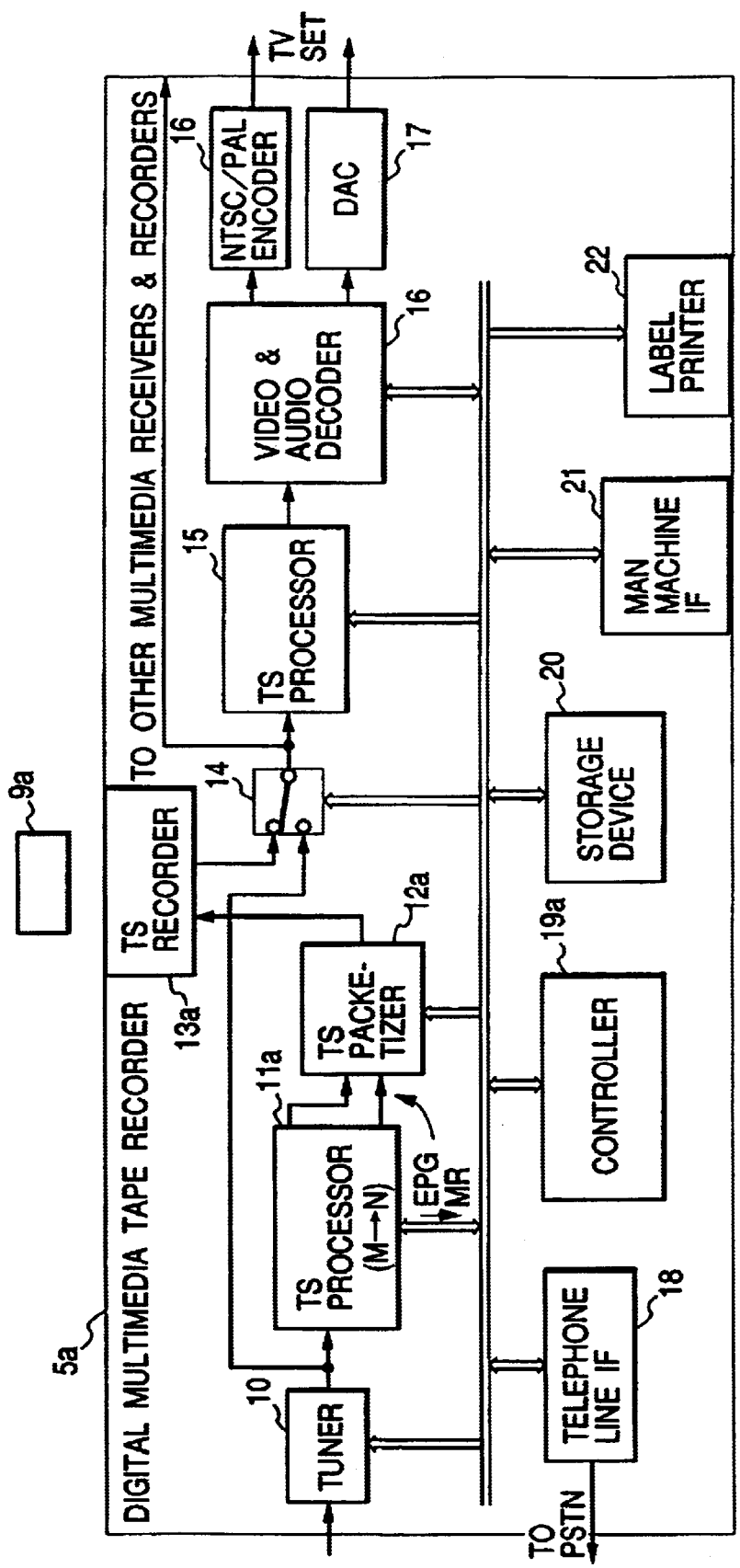
FIG. 14 is a schematic block diagram showing an arrangement of an illustrative embodiment of a digital multimedia tape recorder which is according to the invention and which is used as the recorder 5 of FIG. 1.

FIG. 14 is a schematic block diagram showing an arrangement of an illustrative embodiment of a digital multimedia tape recorder 5a which is used as the recorder 5 of FIG. 1. The tape recorder 5a of FIG. 14 is identical to the disc recorder 5 of FIG. 2 except that the TS processor 11, the TS packetizer 12, the TS disc recorder 13, and the controller 19 have been replaced with the TS processor 11a, TS packetizer 12a, a TS tape recorder 13a and the controller 19a. Only the differences are described in the following.

Figure 15:
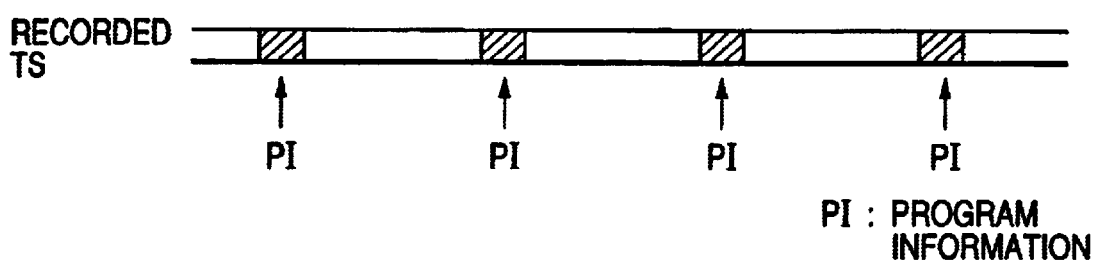
FIG. 15 is a diagram conceptually showing an example of a transport stream to be recorded.

In recording operation, the TS processor 11a supplies not only packets of programs specified by the controller 19a but also program information for the programs to the TS packetizer 12a. The TS packetizer multiplexes the received packets and the program information into a TS packet stream as shown in FIG. 15. In FIG. 15, slashed parts indicate program information.

Figure 16:
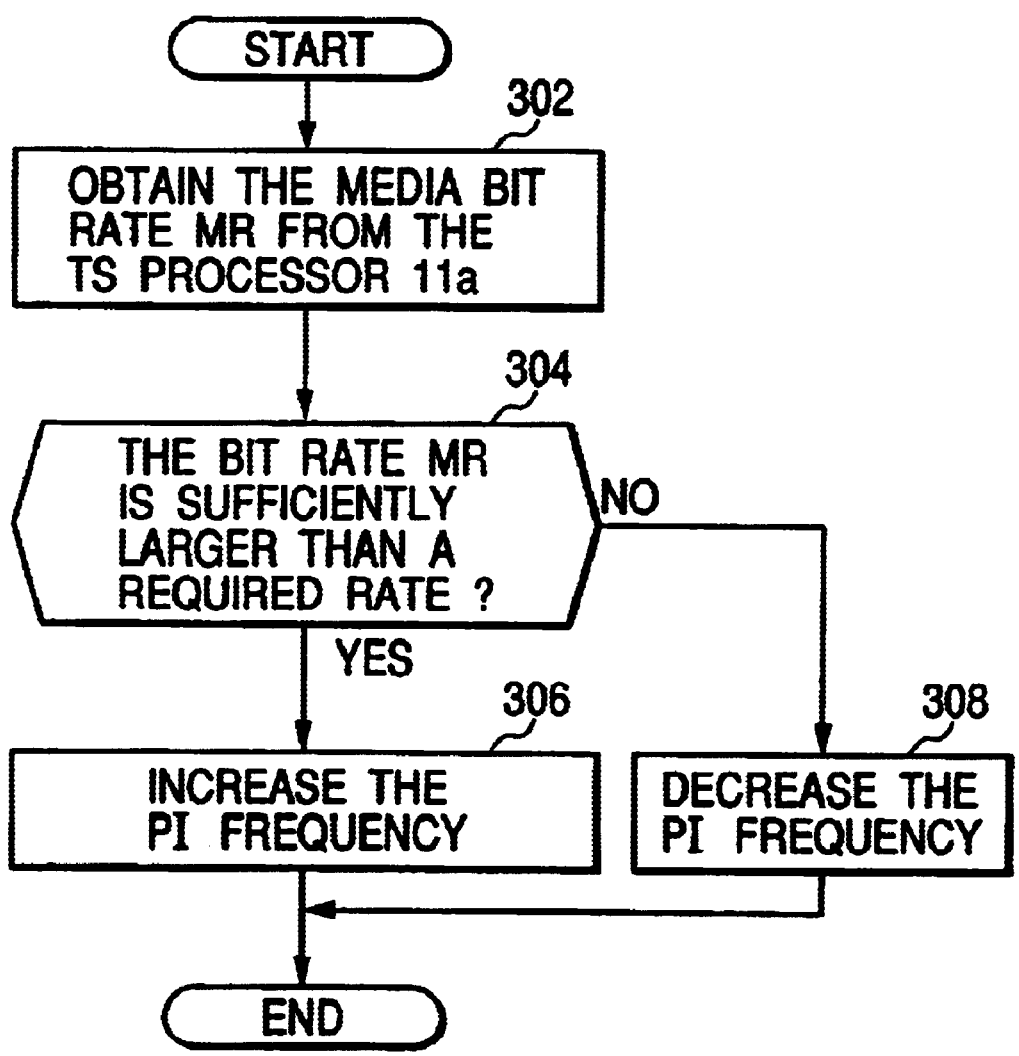
FIG. 16 is a flowchart showing a periodically executed operation of adjusting the frequency of the PI's inserted in the recorded TS in recording operation.

Doing this enables a program guide to be displayed by first forwarding or winding back the tape 9a to a location where the program information is recorded when the user issues a play command. For this purpose, the program information is preferably recorded more frequently. However, there is a limitation on the recording rate of program information (PI). Specifically, the maximum recording rate has to be equal to or greater than the average media MR rate plus the average program information rate. For this reason, the frequency of PI's is periodically adjusted as shown in FIG. 16. In FIG. 16, the controller 19a obtains the media bit rate MR from the TS processor 11a in step 302. A test is made in step 304 to see if the media bit rate MR is sufficiently larger than a required rate. If so, the PI insertion frequency is increased. Otherwise, the PI insertion frequency is decreased.

However, if a plurality of programs of different time periods are recorded in a single tape media, each recorded PI does not necessarily include program information for all the programs recorded on the medium 9a. For this, it is preferable to reserve a predetermined area of the tape, e.g., a head portion of the tape for recording PI for all the recorded programs and to record only a medium ID 146 in a predetermined location of the reserved area. It should be noted that the recording operation is preferably performed according to FIG. 6. In this case, step 208 is omitted. Instead of omitting the step 208, it is preferable to copy all of the RPI records with the same medium ID as the medium being used to the reserved area when the reserved area is accessed (e.g., when the tape is rewound to the beginning of the tape 9a).

Figure 17:
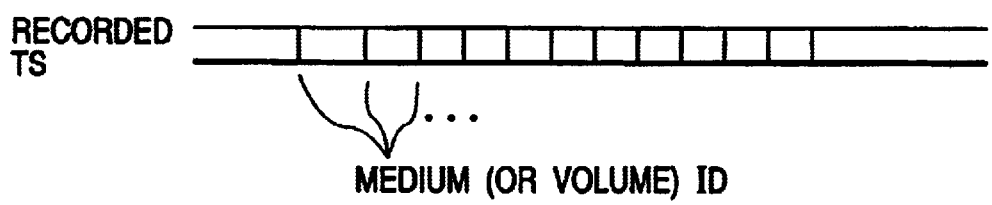
FIG. 17 is a diagram conceptually showing another example of a transport stream to be recorded.
Figure 18:
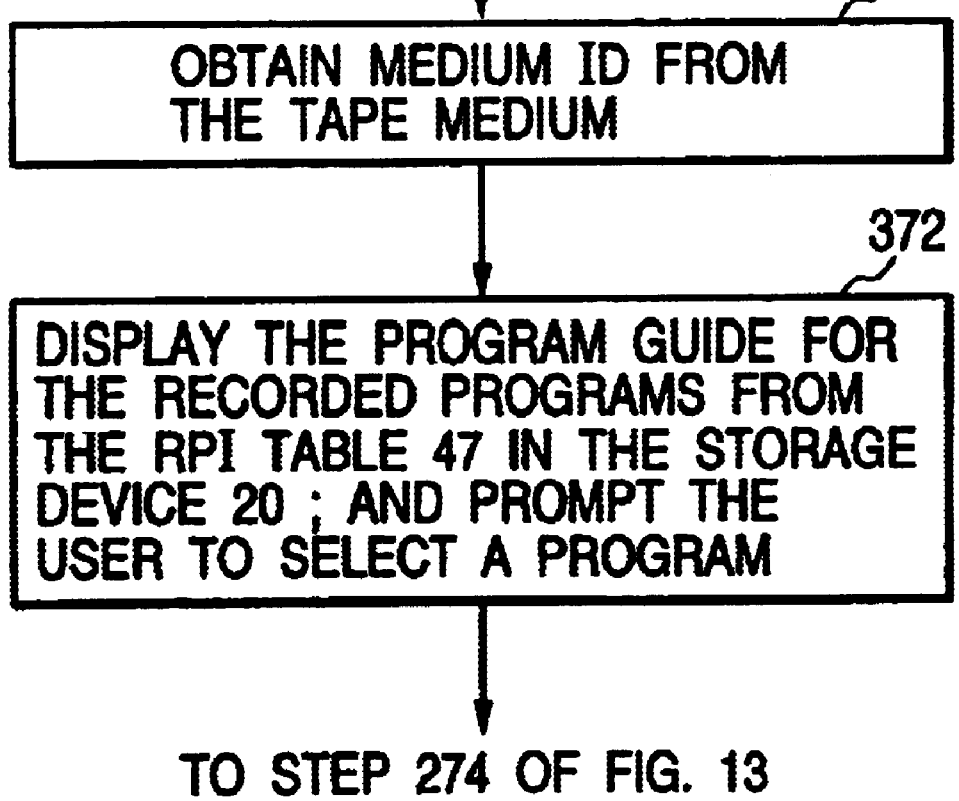
FIG. 18 is a diagram showing steps 371 and 372 which is used in place of step 272 in playing operation of a tape recorder 5a of FIG. 14.

Instead of recording PI together with program data, only the medium ID of the medium 9a is preferably multiplexed with the media data as shown in FIG. 17. In this case, the frequency of medium ID insertion can be much increased as compared with PI insertion. In this case, the playing operation is preferably executed according to the flowchart of FIG. 13. However, step 272 is replaced with steps shown in FIG. 18. Specifically, after step 262 or 270, the controller 19a obtains the medium ID 146 from the recording medium 9a by first winding in either direction to find the medium ID 146 in step 371. In step 372 the controller 19a displays a program guide for the recorded programs of the tape 9a from the RPI table 47 in the storage device 20; and prompts the user to select a program. Then, the controller 19a proceeds to step 274 of FIG. 13. This enables a program guide of the recorded programs to be promptly displayed by a small quantity of winding or rewinding in response to a play or reproduction request from the user.

Figure 19:
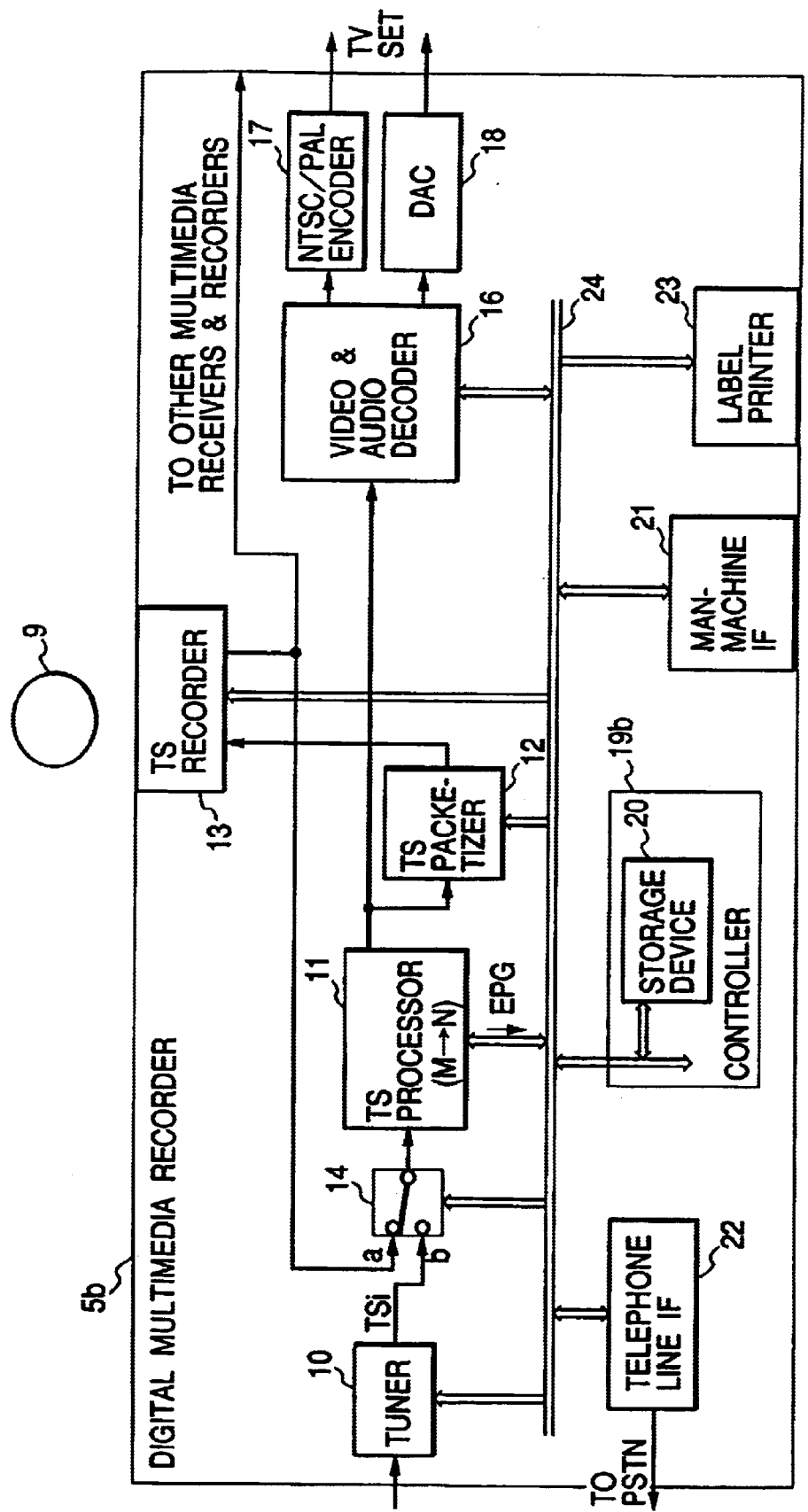
FIG. 19 is a schematic block diagram showing a simplified version of the digital multimedia disc recorder of FIG. 2.

The TS processor 15 of FIG. 2 may be omitted as shown in FIG. 19. In FIG. 19, a controller 19b sets the switch 14 to the beside during recording operation and to the a side during playing operation. Though the multimedia recorder 5 (FIG. 2) and 5a (FIG. 14) permits simultaneous recording and playing, the multimedia recorder 5b of FIG. 19 does not. It is apparent to those skilled in the art that the same simplification may be applied to the recorder 5a of FIG. 14.

In the above-described embodiments, the broadcasting transmitter 1 has optionally broadcast the values of TITLE 133, TIME & DATE 134, SUBTITLE 135, and COUNT IN A SERIAL 136 fields for a related program (FIGS. 3 and 4), and the values of CHANNEL ID 132 and TIME & DATE 134 fields for a recommended program (FIG. 5). However, transmitting these data causes the transmission and storage efficiencies to be lowered. In order to raise the transmission and storage efficiencies, the broadcasting transmitter 1 may transmit only a channel ID 132 (e.g., the service ID) and a not-shown program ID (e.g., the event ID) unique in the channel as a related program or a recommended program. The multimedia recorder 5 can use the channel ID 132 and the not-shown program ID to access a program information record in the PI table 32 associated with the two IDs. Doing this enhances the transmission efficiency and the storage efficiency. However, this technique is only valid for programs the program information of which has been transmitted to to the recorder 5. For this reason, it is preferable for the broadcast transmitter 1 to transmit the two IDs for a related or recommended program whose program information has been already broadcast and to transmit the above-mentioned field (133–136 or 132–134) values for a related or recommended program whose program information has not yet been broadcast.

Also, though the above-described embodiments have identified a program information record by using the channel ID 132 and the broadcast time & date 134 of the program, a program information record may be identified by using the channel ID 132 and the program ID.

In the above-described embodiments, the values of the time period fields 138 has been described as transmitted from the transmitter 1. Alternatively, the TS processor 11 may monitor the channel configuration of each program. In this case, if the TS processor 11 detects a change in the channel configuration of a program, then the TS processor 11 stores the start and end times of the channel configuration before the detected change which times are measured from the beginning of the program.

In the above-described embodiments, the numeral 3 has been described as a video rental center. However, the video rental center 3 may be replaced with a video software vender's center. In this case, the RENTAL CODE field 142 is read as a purchase flag, which has only two states, i.e., a "purchased" state and a "not-purchased" state. The recorder 5 is so arranged as to initially set the purchase flag of a program for sale to the not-purchased state. and set it to the purchased state in response to a receipt of an acknowledgement which is sent from the video software's center after the user has performed a predetermined operation.

In the above-described embodiments, the TS stream from the TS packetizer 12 has been recorded on the recording medium 9. However, any of the MPEG-2 bit stream from the TS processor 15, the video and audio digital outputs from the video and audio decoder 16, and the analog video and audio outputs from the elements 17 and 18 respectively may be recorded on the recording medium 9 as is apparent to those skilled in the art.

Figure 20:
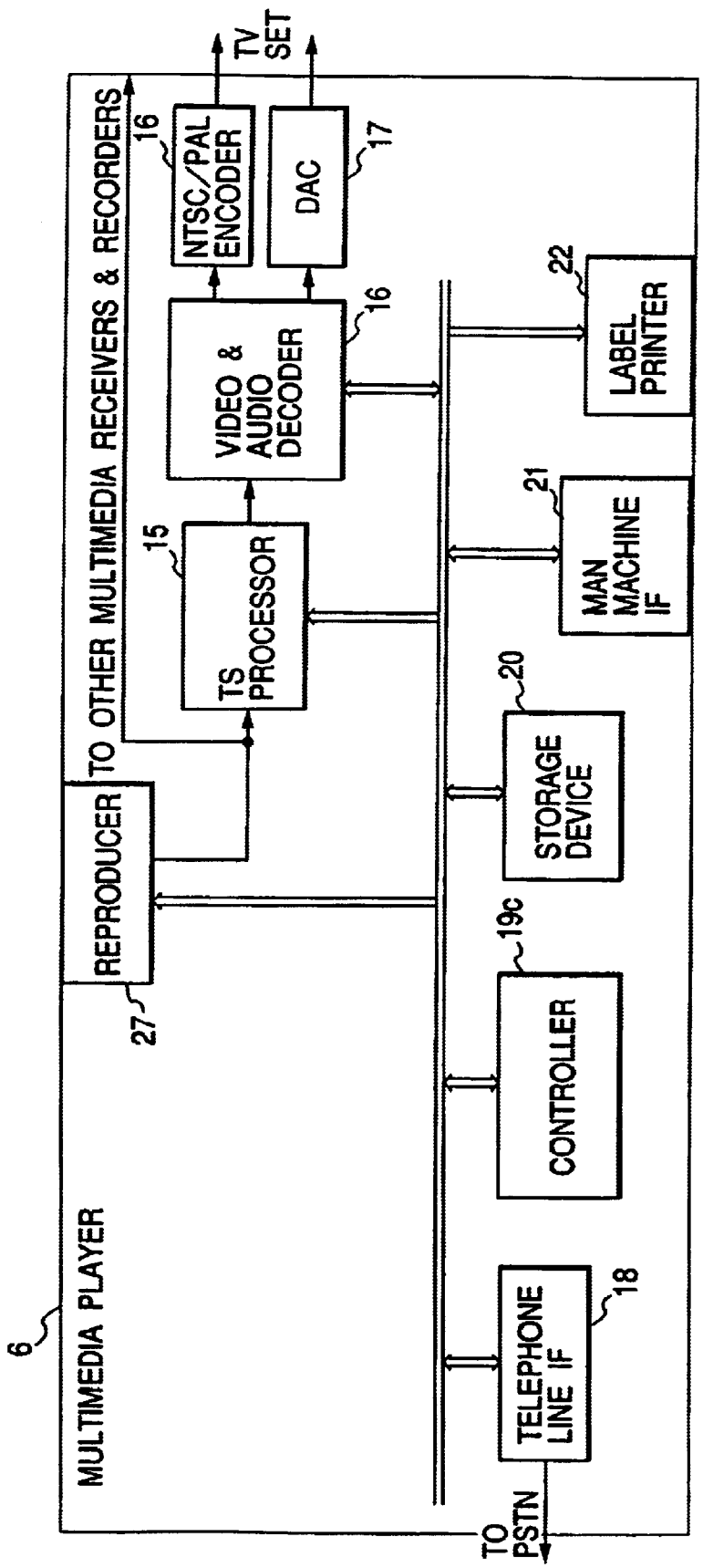
FIG. 20 is a schematic block diagram showing an arrangement of an illustrative embodiment of a digital multimedia player according to the principles of the invention.

It should be noted that the present invention is applicable to a multimedia player without a recording capability as shown in FIG. 20. The player 6 of FIG. 20 is identical to the recorder 5 of FIG. 2 except that the elements 10–12 and 14 have been eliminated and the TS disc recorder 13 and the controller 19 have been replaced with a reproducer 27 and a controller 19c, respectively. In this embodiment, the recorded program information of each medium is stored only on the recording medium but not in the storage device 20. When a medium is inserted in the player 27, the program information recorded on the medium is preferably read out in the storage device 20 for subsequent use.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of managing recorded programs recorded in a recording medium in a broadcasting system comprising at least one transmitter and a plurality of terminals,
   wherein each transmitter broadcasts a data stream, each data stream comprising a multiplexed plurality of channels, each channel comprising a plurality of programs and each data stream including program information comprising program information (PI) records associated with respective programs available in the broadcasting system, the method comprising the steps of:
      each terminal permitting a user to select a desired one of said programs;
      adding said selected program to a recording queue that keeps program-identifying data sets in order of broadcast start time;
      recording on said recording medium a program identified by one of said program-identifying data sets in a first position of said recording queue;
      recording a program information record of said recorded program in a predetermined area on said recording medium;
      in response to reception of a playing request from the user, displaying a program guide for said recorded programs recorded on said recording medium;
      prompting the user to select one of said recorded programs for play; and
      in response to the user selecting said one of said recorded programs, playing said selected recorded program to provide video and/or audio output(s),
      wherein said step of permitting a user to select a desired one of said programs includes the step of permitting a user to select one of video channels and one of audio channels, said video and audio channels constituting said desired program,
      wherein said recording step includes the steps of:
         extracting video data of said selected video channel and audio data of said selected audio channel from a data stream including said video and audio channels;
         converting said video data and said audio data into a time-division-multiplexed packet stream in a same form as said data stream; and
         recording said time-division-multiplexed packet stream on said recording media, and
      wherein, if a program varies in its channel configuration in a middle of duration thereof, said PI record of the program includes time periods for respective channel configurations of the program and a channel configuration for each of said time periods, each channel configuration indicating:
         said video and audio channels that constitute the program for a time period associated with said each channel configuration;
         said displaying step displays said time periods and corresponding channel configurations; and
         said selecting one of video channels and one of audio channels includes selecting, for each time period, a video and a audio channel from a channel configuration associated with the time period.

2. A method of managing recorded programs recorded in a recording medium in a broadcasting system comprising at least one transmitter and a plurality of terminals, wherein each transmitter broadcasts a data stream, each data stream comprising a plurality of multiplexed channels, each channel comprising a plurality of programs and each data stream including program information comprising program information (PI) records associated with respective programs available in the broadcasting system, the method comprising the steps of:
   each terminal
   permitting a user to select a desired one of said programs;
   adding said selected program to a recording queue that keeps program-identifying data sets in order of broadcast start time;
   recording on said recording medium a program identified by one of said program-identifying data sets in a first position of said recording queue;
   recording a program information record of said recorded program in a predetermined area on said recording medium;
   in response to reception of a playing-request from the user, displaying a program guide for said recorded programs recorded on said recording medium;
   prompting the user to select one of said recorded programs for play; and
   in response to the user selecting said one of said recorded programs, playing said selected recorded program to provide video and/or audio output(s),
   wherein said recording medium is a removable tape medium,
   wherein said step of recording a program includes the step of:
      recording said program and PI record associated with said program in time-division-multiplexing; and
      adjusting a recording frequency of said PI record according to a possible maximum recording rate minus a transmission rate required for said program.

3. A multimedia terminal capable of managing recorded programs recorded in a recording medium in a broadcasting system comprising at least one transmitter and a plurality of terminals, wherein each transmitter broadcasts a data stream, each data stream comprising a plurality of multiplexed channels, each channel comprising a plurality of programs and each data stream including program information comprising program information (PI) records associated with respective programs available in the broadcasting system, the multimedia terminal comprising:
   means for permitting a user to select a desired one of said programs;
   means for adding said selected program to a recording queue that keeps program-identifying data sets in order of broadcast start time;

means for recording on said recording medium a program identified by one of said program-identifying data sets in a first position of said recording queue;

means for recording a program information record of said recorded program in a predetermined area on said recording medium;

means, responsive to reception of a playing request from the user, for displaying a program guide for said recorded programs recorded on said recording medium;

means for prompting the user to select one of said recorded programs for play; and means, response to the user selecting said one of said recorded programs, for playing said selected recorded program to provide video and/or audio output(s), wherein said means for permitting a user to select a desired one of said programs includes means for permitting a user to select one of video channels and one of audio channels, said video and audio channels constituting said desired program, wherein said recording means includes:
- means for extracting video data of said selected video channel and audio data of said selected audio channel from a data stream including said video and audio channels;
- means for converting said video data and said audio data into a time-division-multiplexed packet stream in a same form as said data stream; and
- means for recording said time-division-multiplexed packet stream on said recording media, and wherein if a program varies in its channel configuration in a middle of duration thereof, said PI record of the program includes time periods for respective channel configurations of the program and a channel configuration for each of said time periods, each channel configuration indicating said video and audio channels that constitute the program for a time period associated with said each channel configuration;
- said displaying means includes means for displaying said time periods and corresponding channel configurations; and
- said means for permitting a user to select one of video channels and one of audio channels includes means for selecting, for each time period, a video and a audio channel from a channel configuration associated with the time period.

4. A multimedia terminal capable of managing recorded programs recorded in a recording medium in a broadcasting system comprising at least one transmitter and a plurality of terminals, wherein each transmitter broadcasts a data stream, each data stream comprising a plurality of multiplexed channels, each channel comprising a plurality of programs and each data stream including program information comprising program information (PI) records associated with respective programs available in the broadcasting system, the multimedia terminal comprising:

means for permitting a user to select a desired one of said programs;

means for adding said selected program to a recording queue that keeps program-identifying data sets in order of broadcast start time;

means for recording on said recording medium a program identified by one of said program-identifying data sets in a first position of said recording queue;

means for recording a program information record of said recorded program in a predetermined area on said recording medium;

means, responsive to reception of a playing request from the user, for displaying a program guide for said recorded programs recorded on said recording medium;

means for prompting the user to select one of said recorded programs for play; and means, response to the user selecting said one of said recorded programs, for playing said selected recorded program to provide video and/or audio output(s), wherein said recording medium is a removable tape medium, wherein said means for recording a program includes:
- means for recording said program and PI record associated with said program on said recording medium; and
- means for adjusting a recording frequency of said PI record according to a possible maximum recording rate minus a transmission rate required for said program.

* * * * *